Patented June 21, 1938

2,121,207

UNITED STATES PATENT OFFICE 2,121,207

NEW BASICALLY SUBSTITUTED ACRIDINE COMPOUNDS

Fritz Mietzsch, Wuppertal-Elberfeld, and Hans Mauss, Wuppertal-Barmen, Germany, assignors to Winthrop Chemical Company, Inc., New York, N. Y., a corporation of New York No Drawing. Application June 3, 1935, Serial No. 24,775. In Germany June 7, 1934

10 Claims. (Cl. 260—36)

This invention relates to new basically substituted acridine compounds and is a further development of the invention described and claimed in our co-pending application for Letters Patent Ser. No. 534,460, filed May 1, 1931, and Ser. No. 726,866, filed May 21, 1934. The new acridine compounds same as the acridine compounds described in the said co-pending applications are distinguished by a considerable efficacy on blood parasites.

In accordance with the present invention the new acridine compounds displaying the said anti-parasitic properties particularly against malaria parasites are obtainable by the manufacture of acridine compounds of the general formula:

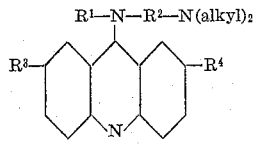

in which $R^1$ stands for hydrogen or alkyl, such as methyl or ethyl, $R^2$ stands for an aliphatic radical, such as a methylene, ethylene, propylene, hydroxypropylene group, or for alkylene groups which are interrupted by ether-like bound oxygen or sulfur atoms, and $R^3$ and $R^4$ stand for alkyl, alkoxy or alkylthio groups, such as the methyl, ethyl, butyl, methoxy, isopropyloxy, hydroxypropyloxy, methylthio, ethylthio group and the like. The said alkyl, alkoxy and alkylthio groups in the 2- and 7-position of the new acridine compounds have proved to be of essential importance as to the anti-parasitic properties of the new products and are equivalent in this respect.

In accordance with the present invention the said new acridine compounds are prepared by reacting upon such acridine substitution products as contain in the 9-position a replaceable substituent and in the 2- and 7-position an alkyl, alkoxy or alkylthio group, with aliphatic polyamines containing a primary or secondary amino group. Replaceable substituents in the 9-position are, for instance, ether and ester like groups, such as halogen, aryloxy, alkoxy, aryl- and alkylmercapto groups. The reaction is preferably carried out in phenolic solution while heating, advantageously on the water-bath. Also other organic substances, containing hydroxyl or sulfhydryl groups, have proved to be suitable solvents, for instance, ethyl alcohol, glycol, amyl alcohol, cresol, naphthol, thiophenol, and the like. The reaction temperature is advantageously at about 130° C. when using these substances as solvents. If necessary the reaction is performed in closed vessels. Presumably when using the 9-halogen derivatives as starting materials the reaction sometimes takes place with the formation of acridines, containing the radical of the solvent used in ether- or thioether-like linkage in the 9-position, as intermediate products. The reaction is complete after heating for about one to several hours. The new base formed may be separated off by rendering the reaction mixture alkaline and taking up the base precipitated in an organic solvent, such as ether, methylene chloride or the like.

The aliphatic polyamine containing a primary or secondary amino group may contain substituents, for example, the hydroxyl group and ether- or thioether-like linkages. Suitable amines are, for instance, diethylaminoethylmethylamine, dimethylaminoethylamine, 1-diethylamino-2-hydroxypropyl-3-ethylamine, 1-diethylamino-4-pentylamine, diethylaminoethylthio-propylamine, dimethylaminoethoxy-ethylamine, and the like.

The new acridine compounds are in the form of the free bases light yellow substances which are soluble in the usual organic solvents, for example, ether, alcohol, acetone, benzene and methylene chloride. They may be dissolved in water in the form of their salts with acids, such as hydrochloric, hydrobromic, sulfuric, acetic, citric, tartaric, lactic acid and the like. These salts are obtained in the customary manner by neutralizing the free base with the acid. Two equivalents of the acid neutralize one mol. of the base. Of course, the free bases are soluble in dilute mineral acids and organic acid with the formation of the water-soluble salts.

The invention is further illustrated by the following examples without being restricted thereto:—

*Example 1.*—27.4 grams of 2.7-dimethoxy-9-chloro-acridine are melted in the water-bath with 100 grams of phenol and 16 grams of α-diethylamino-delta-aminopentane are added while stirring and heating for 1 hour to 90–100° C. The reaction mixture is then introduced into 1000 ccs. of 2-normal caustic soda solution and the 2.7-dimethoxy-9-α-diethylamino-delta-pentylaminoacridine formed is taken up in ether. It is purified by way of its acetic acid salt and separated as yellow dihydrochloride which is readily soluble in water and decomposes at 245–250° C.

The 2.7-dimethoxy-9-chloroacridine (yielding yellow crystals from benzene, which melt at 228–

229° C.) is obtained from the 4.4'-dimethoxy-diphenylamine-6-carboxylic acid (yielding yellow crystals from alcohol, melting at 167–168° C.) by subjecting it to ring closure and chlorination.

The dihydrochlorides of 2.7-dimethoxy-(α-dimethyl-amino-β-ethylamino)-acridine, 2.7-dimethoxy-9-(α-diallylamino-γ-propylamino)-acridine, 2.7-dimethoxy-9-(α-diethylamino-delta-butylamino)-acridine, are obtained in the form of yellow crystal powders when using in the above example instead of α-diethylamino-delta-aminopentane α-dimethyl-amino-β-aminoethane, α-diallylamino-γ-aminopropane, α-diethylamino-delta-aminobutane, respectively. Their properties correspond to those of the above described dihydrochloride.

When using α-diethylaminoethylthio-γ-aminopropane (boiling at 135–136° C. under 12 mm. pressure), or dimethyl-aminoethoxy-β-aminoethane (boiling at 88–92° C. under 11 mm. pressure) the dihydrochlorides of 2.7-dimethoxy-(α-diethylaminoethylthio-γ-propylamino)-acridine, and of 2.7-dimethoxy-9-(α-dimethylaminoethoxy-β-ethylamino)-acridine are obtained in the form of yellow crystals which are soluble in water.

Instead of the dihydrochlorides the salts with other acids, for instance, hydrobromic acid, sulfuric acid, nitric acid, acetic, lactic, tartaric acid and the like may be prepared in an analogous manner.

*Example 2.*—33.1 grams of 2.7-dimethoxy-9-phenoxy-acridine are treated with 15 grams of α-diethylamino-β-hydroxy-γ-aminopropane in accordance with the directions indicated in Example 1. The dihydrochloride of the 2.7-dimethoxy-9-(α-diethylamino-β-hydroxy-γ-propylamino)-acridine is obtained as yellow dihydrochloride which is readily soluble in water with yellowish-green fluorescence and decomposes at 240° C. Also the dihydrobromide, the sulfate and the dinitrate are readily soluble in water.

The 2.7-dimethoxy-9-phenoxyacridine prepared from 2.7-dimethoxy-9-chloroacridine by treatment with phenol, the two components being melted at water-bath temperature, crystallizes from alcohol in thin leaflets melting at 147–148° C. Its hydrochloride forms yellow glittering leaflets which are difficultly soluble in water and decompose at 225° C.

*Example 3.*—On treating 2-isopropyloxy-7-methoxy-9-chloroacridine with α-diethylamino-delta-aminopentane the 2-isopropyloxy-7-methoxy-9-(α-diethylamino-delta-pentylamino)-acridine is obtained. It is isolated as a yellow citrate which is readily soluble in water with yellowish-green fluorescence.

From 4-methoxy-4'-isopropyloxydiphenylamine-6-carboxylic acid (yielding thin yellow needles from ligroin, melting at 156–157° C.) the 2-isopropyloxy-7-methoxy-9-chloroacridine (yielding yellow crystals from ligroin, melting at 129–130° C.) is obtained by subjecting the former product to ring closure and chlorination.

*Example 4.*—On treating 2-methylmercapto-7-methoxy-9-chloroacridine with α-diethylamino-delta-aminopentane the 2-methylmercapto-7-methoxy-9-(α-diethylamino-delta-pentylamino)-acridine is obtained which as citrate or tartrate forms a deep-yellow colored powder which is readily soluble in water.

From the 4-methoxy-4'-methylmercapto-diphenylamine-6-carboxylic acid (from alcohol yolk-like colored needles melting at 175–176° C.) the 2-methylmercapto-7-methoxy-9-chloro-acridine (from benzene yolk-like colored needles melting at 181–183° C.) is obtained by subjecting the former to ring closure and chlorination.

The 2-butylmercapto-7-methoxy-9-chloroacridine is prepared in an analogous manner. When reacting thereupon with α-diethylamino-delta-aminopentane the 2-butylmercapto-7-methoxy-9-(α-diethylamino-delta-pentylamino)-acridine is obtained. It forms a lactate which is readily soluble in water.

*Example 5.*—The 2-methyl-7-methoxy-9-(α-diethylamino-delta-pentylamino)-acridine is obtained from 2-methyl-7-methoxy-9-chloroacridine and α-diethylamino-delta-amino-pentane. It forms a citric acid salt which is readily soluble in water with yellowish-green fluorescence.

The 2-methyl-7-methoxy-9-chloroacridine (from ligroin pale-yellow needles melting at 161–162° C.) is obtained from the 4'-methyl-4-methoxydiphenylamine-6-carboxylic acid (from alcohol yellow prisms melting at 160–161° C.) by subjecting the latter to ring closure and chlorination.

The 2-ethyl-7-methoxy-9-chloroacridine is prepared in an analogous manner. When reacted with α-diethylamino-delta-aminopentane it is transformed into the 2-ethyl-7-methoxy-9-(α-diethylamino-delta-pentylamino)-acridine. It is readily soluble in water in the form of its salts, for instance, with lactic, citric and tartaric acid.

*Example 6.*—The 2.7-dimethyl-9-(α-diethylamino-delta-pentylamino)-acridine is obtained from 2.7-dimethyl-9-chloroacridine and α-diethylamino-delta-aminopentane. Its yellow dihydrochloride is readily soluble in water and melts at 245–250° C. with decomposition.

The 2.7-dimethyl-9-chloroacridine (from ligroin pale-yellow crystal powder melting at 154–155° C.) is obtained from 4.4'-dimethyldiphenylamine-6-carboxylic acid (from alcohol or benzene yellowish crystals melting at 187–188° C.) by subjecting it to ring closure and chlorination.

*Example 7.*—The 2.7-dimethyl-9-(α-diethylamino-β.β-dimethyl-γ-propylamino)-acridine is obtained from 2.7-dimethyl-9-chloroacridine and α-diethylamino-β.β-dimethyl-γ-aminopropane. Its dihydrochloride decomposes at 238–240° C.

*Example 8.*—From 2-n-butyloxy-7-methoxy-9-chloroacridine and α-diethylamino-δ-aminopentane the 2-n-butyloxy-7-methoxy-9-(α-diethylamino-delta-pentylamino)-acridine is obtained in accordance with the methods indicated in Example 1. It yields a citric acid salt which is soluble in water with yellowish-green fluorescence and decomposes with foaming at 100° C.

In an analogous manner the 2-n-butyloxy-7-methoxy-9-(α-diethylamino-β-hydroxy-γ-propylamino)-acridine is obtained from 2-n-butyloxy-7-methoxy-9-chloroacridine and α-diethylamino-β-hydroxy-γ-aminopropane. Its hydrochloric acid salt melts at 201–202° C.

The 2-n-butyloxy-7-methoxy-9-chloroacridine (from ligroin thin, yellow needles melting at 133° C.) is obtained from 4-methoxy-4'-n-butyloxy-diphenylamine-6-carboxylic acid (from alcohol yellow crystals melting at 130–131° C.) by subjecting it to ring closure and chlorination.

*Example 9.*—By reacting the 2-n-butyloxy-7-ethoxy-9-chloroacridine with α-diethylamino-delta-aminopentane in the above described manner the 2-n-butyloxy-7-ethoxy-9-(α-diethylamino-delta-pentylamino)-acridine is obtained. It forms as citric acid salt a yellow powder which is readily soluble in water.

The 2-n-butyloxy-7-ethoxy-9-(α-diethylamino-

β-hydroxy - γ - propylamino) - acridine, obtained when using α-diethylamino-β-hydroxy-γ-aminopropane and the 9-chloroacridine compound referred to above, yields a yellow hydrochloric acid salt melting at 230–231° C.

The 2-n-butyloxy-7-ethoxy-9-chloroacridine (from benzene white, crystalline powder melting at 147° C.) is obtained from 4-ethoxy-4'-n-butyloxydiphenylamine-6-carboxylic acid (from alcohol yellowish-green crystals melting at 136–137° C.) by subjecting it to ring closure and chlorination.

*Example 10.*—The 2-n-hexyloxy-7-methoxy-9-(α-diethylamino-delta-pentylamino) - acridine is obtained from 2-n-hexyloxy-7-methoxy-9-chloroacridine and α-diethylamino-delta-aminopentane in accordance with the methods indicated in Example 1. It is isolated as a citric acid salt which is readily soluble in water.

The 2-n-hexyloxy-7-methoxy-9-(α-diethylamino-β-hydroxy-γ-propylamino)-acridine is obtained when reacting α-diethylamino-β-hydroxy-γ-aminopropane with 2-n-hexyloxy-7-methoxy-9-chloroacridine. Its yellow hydrochloric acid salt melts at 189–190° C. while decomposing.

The 2-n-hexyloxy-7-methoxy-9-chloroacridine is obtained as yellowish-green powder melting at 74–75° C. after subjecting the 4-methoxy-4'-n-hexyloxydiphenylamine-6-carboxylic acid (from ligroin yellow scales melting at 102–103° C.) to ring closure and chlorination.

We claim:—

1. Acridine compounds of the general formula:

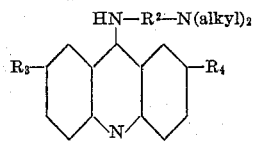

wherein $R^2$ stands for an aliphatic radical and $R^3$ and $R^4$ each stand for a substituent of the group consisting of the alkyl, alkoxy and alkylthio groups, which compounds in the form of the free bases are soluble in organic solvents and in the form of their salts with acids are soluble in water.

2. Acridine compounds of the general formula:

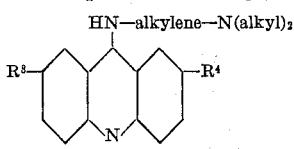

wherein $R^3$ and $R^4$ each stand for a substituent of the group consisting of the alkyl, alkoxy and alkylthio groups, which compounds in the form of the free bases are soluble in organic solvents and in the form of their salts with acids are soluble in water.

3. Acridine compounds of the general formula:

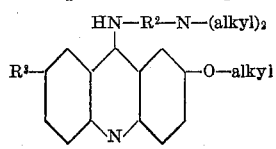

wherein $R^2$ stands for an aliphatic radical, and $R^3$ stands for a substituent of the group consisting of the alkyl, alkoxy and alkylthio groups, which compounds in the form of the free bases are soluble in organic solvents and in the form of their salts with acids are soluble in water.

4. Acridine compounds of the general formula:

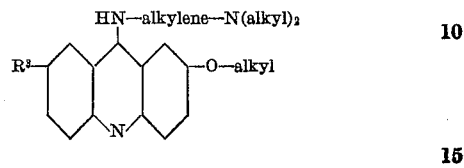

wherein $R^3$ stands for a substituent of the group consisting of the alkyl, alkoxy and alkylthio groups, which compounds in the form of the free bases are soluble in organic solvents and in the form of their salts with acids are soluble in water.

5. Acridine compounds of the general formula:

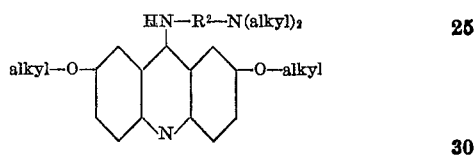

wherein $R^2$ stands for an aliphatic radical, which compounds in the form of the free bases are soluble in organic solvents and in the form of their salts with acids are soluble in water.

6. Compounds of the group consisting of the 2.7-dialkoxy-9-dialkylaminoalkylamino-acridines and their salts, which compounds in the form of the free bases are soluble in organic solvents and in the form of their salts with acids are soluble in water.

7. Compounds of the group consisting of the 2.7-dialkoxy-9-diethylaminoalkylamino-acridines and their salts, which compounds in the form of the free bases are soluble in organic solvents and in the form of their salts with acids are soluble in water.

8. Compounds of the group consisting of the 2.7-dialkoxy-9-(α-diethylamino-delta-pentylamino)-acridines and their salts, which compounds in the form of the free bases are soluble in organic solvents and in the form of their salts with acids are soluble in water.

9. 2.7-dimethoxy-9-(α-diethylamino-delta-pentylamino)-acridine, which compound in the form of the free base is soluble in organic solvents and in the form of its salts with acids is soluble in water.

10. 2.7-dimethoxy-9-(α-diethylamino-delta-pentylamino)-acridine-dihydrochloride which forms a water-soluble yellow crystal powder decomposing at 245–250° C.

FRITZ MIETZSCH.
HANS MAUSS.